Figure 1:
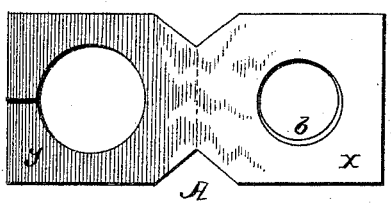

(No Model.)

C. C. DAVISON.
NUT LOCK.

No. 467,925. Patented Feb. 2, 1892.

Witnesses:
J. B. McGirr.
G. L. Main.

Inventor:
C. C. Davison
By Joseph A. Harris
Attorney

UNITED STATES PATENT OFFICE.

CHARLES C. DAVISON, OF MONCTON, CANADA, ASSIGNOR OF THREE-FOURTHS TO JOSEPH A. HARRIS, OF SAME PLACE.

NUT-LOCK.

SPECIFICATION forming part of Letters Patent No. 467,925, dated February 2, 1892.

Application filed February 3, 1891. Serial No. 380,093. (No model.)

*To all whom it may concern:*

Be it known that I, CHARLES C. DAVISON, of the city of Moncton, in the county of Westmoreland, Province of New Brunswick, and Dominion of Canada, have invented a new and useful Improvement in Nut-Locks or Fastenings for Nuts on Bolts, of which the following, taken in connection with the accompanying drawings, forms an exact, full, and clear specification thereof.

My invention relates to nut-locks or fastenings for nuts on bolts which screw on the bolt after the nut.

I am aware that previous to my invention nuts have been secured or locked by means of a device bearing some resemblance to mine, inasmuch as a V-shaped spring was employed with straight thread cut on one arm and an open hole of larger diameter cut on the other arm of the V, which latter arm was placed next the nut to allow the spring or hinge of the V to play and bind against the nut while the threaded arm was set to hold the same in position; but there are difficulties in this device which mine is designed to overcome, and which will be apparent on referring to the drawings and the description which follows.

I attain the object of my invention by introducing in one of the arms of the V an inclined thread cut on a suitable angle from the thread on the bolt and by making an incision in the other arm, so as to enable double springs to be formed by turning one edge thereof up and the other edge down, or forming several bearings by deflecting the edges thereof in opposite directions, thus combining the V-spring and the several other springs or bearings so formed with the said inclined thread in the upper arm, by which means a fourfold pressure upon the nut and bolt is produced without deflecting the bolt.

The locking-plate is constructed of a flat piece of spring-steel of suitable thickness, in which is cut two holes at proper distances from each other, and in one of which holes an inclined thread is cut to engage the bolt on an angle to its axis, or, if desired, said thread may be cut straight; but the inclined thread greatly tends to prevent any reverse movement of the nut or nut-lock. In the other end a larger opening is made than the threaded hole and from its center outward is cut a radial incision to the end or outer edge of said plate. The divided parts are then bent or deflected in opposite directions to form several springs or bearings on either side of said incision, after which the plate is bent over to form a V-shaped spring. The nut-lock thus constructed is screwed on the bolt over and outside the nut by means of the thread in the bolt-hole of one arm of the plate, the larger opening being next the nut, while the threaded arm will be outside.

Figure 2:
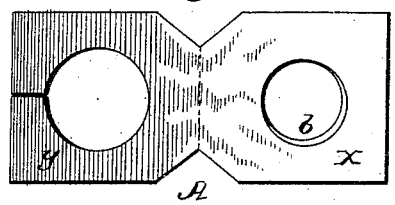
Figure 3:
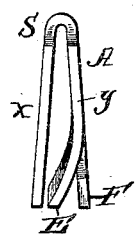
Figure 4:
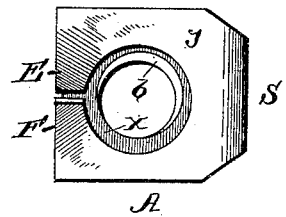
Figure 5:
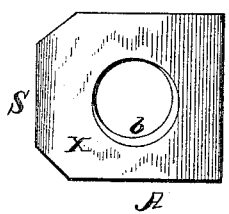
Figure 6:
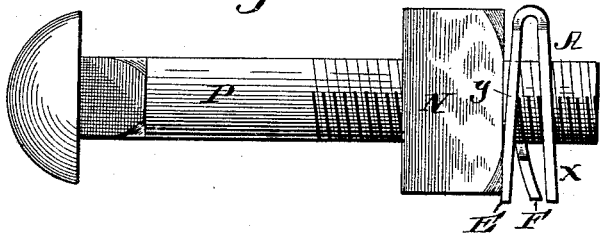

Figure 1 represents the plate cut in the manner described, showing the threaded-hole, the plain opening, and the incision. Fig. 2 shows the manner in which the edges at the end of said plate are curved or deflected to form the springs. Fig. 3 represents a side section and shows the plate after it has been bent into proper shape to form the nut-lock. Figs. 4 and 5 show under and top views of the device. Figs. 6, 7, and 8 show it in different views on a bolt and nut ready for operation.

Similar letters will refer to similar parts.

The nut-lock is made, preferably, of spring-steel, or such metal as will give the required strength and elasticity, and its general dimensions are such as to suit the work it is to perform. The hexagonal form, as shown, has been found to be more favorable to the operation of springs.

In operating this device it will be found that inclining or cutting the thread *b* at an angle from the bolt and face of the nut produces a better result. The use of this inclined thread is a part of my novelty when taken in connection with the springs or bearings, and when this thread is properly cut the upper arm of the nut-lock should stand at an inward incline on the bolt from the heel or bend of the V.

I designate the nut-lock a "compound plate," from the fact that it consists of two connected arms or members forming a spring-hinge, one having a threaded hole and the other having an enlarged opening, and the two deflected springs adapted to contact, respectively, with the bolt and the nut, as well as with the outer arm or member of the plate, when it is screwed on bolt P by means of the thread *b* on the arm *x*, the arm *y* lying next to nut N. The arm $y$ being provided with the deflected springs at E and F, will press against nut N, the downward spring bearing against it, while the upper spring will bear against the threaded outer arm $x$ of the compound plate when the threaded-arm $x$ is screwed up or tightened against it. The spring at S will co-operate with the said springs at E and F as the nut-lock is rotated, thus producing a compound pressure and frictional contact upon both bolt and nut at suitable points, so that when the nut-lock is thoroughly set the several springs will bear together upon the nut and bolt while the inclined thread will exert its pressure and serve to bind the nut while it tightens springs E and F, and increase the frictional contact, thus imparting to the device a most thorough compound locking pressure. With such a construction and operation it will be perceived that the nut can be securely locked against movement in any direction and that the jamming action of the parts upon both nut and bolt must tend to fix the nut in a permanent position.

Having thus described my invention, I claim as new and desire to secure by Letters Patent the following:

1. In a nut-lock such as herein described, the combination of the bolt and nut with a steel plate bent into spring shape, forming a V in cross-section, and applied to the bolt exteriorly of the nut, the outer arm of which is provided with a thread cut at an angle to the face of the nut and the axis of the bolt to engage the bolt on a slight incline and exert an increased frictional contact upon the nut and bolt, the inner arm of said spring-plate having a hole of larger diameter than the threaded hole, the inner arm of said spring-plate being provided with two springs deflected in opposite directions and operating in connection with the hinge or V spring, the parts working in combination to produce a compound frictional contact with the nut and bolt and impinge forcibly against the outer face of the nut, whereby the same is firmly locked and secured against any motion whatever.

2. In a nut-lock substantially as herein described, the combination, with a V-spring formed by bending a steel plate and provided with two openings and the inclined thread cut on the outer arm of the V-spring, of the springs deflected at the point of incison on the inner arm thereof, operating together upon a bolt and primary nut fitted thereon to bind the nut and lock the same by means of the compound frictional contact exerted on the nut and bolt, as set forth.

3. In a nut-lock, the combination, with a V-spring formed by bending a steel plate, of two deflected springs produced by making an incision at the outer edge of the inner arm of the V-spring, the outer arm of said spring-plate being provided with a thread to engage the bolt, operating substantially for the purpose and in the manner herein specified.

4. In a nut-lock, the combination, with a bolt and a nut, of the compound spring-plate fitted on said bolt and having an inner and outer arm, its inner arm provided with deflected spring-prongs which respectively engage the nut and the outer arm, substantially as described.

5. In a nut-lock, the combination, with a bolt and a nut, of the compound spring-plate having an inner and outer arm and in its outer arm an oblique thread which engages the bolt, the inner arm of said spring-plate being provided with spring-prongs which engage, respectively, with the nut and the outer arm, substantially as described.

6. As an article of manufacture, the compound spring-plate herein described, having the inner and outer arms and threaded opening in the outer arm thereof and its other arm provided at the free edge with the deflected spring-prongs, substantially as and for the purpose described.

In testimony that I claim the foregoing I hereto set my hand this 27th day of November, A. D. 1890.

CHARLES C. DAVISON.

In presence of—
JOSEPH A. HARRIS,
GEORGE L. MAIN.